(12) United States Patent
Al Sheikh et al.

(10) Patent No.: US 11,243,772 B2
(45) Date of Patent: Feb. 8, 2022

(54) EFFICIENT LOAD VALUE PREDICTION

(71) Applicant: QUALCOMM Incorporated, San Diego, CA (US)

(72) Inventors: Rami Mohammad A. Al Sheikh, Morrisville, NC (US); Derek Robert Hower, Durham, NC (US)

(73) Assignee: Qualcomm Incorporated, San Diego, CA (US)

( * ) Notice: Subject to any disclaimer, the term of this patent is extended or adjusted under 35 U.S.C. 154(b) by 32 days.

(21) Appl. No.: 16/414,415

(22) Filed: May 16, 2019

(65) Prior Publication Data

US 2020/0364055 A1 Nov. 19, 2020

(51) Int. Cl.
*G06F 9/38* (2018.01)

(52) U.S. Cl.
CPC .......... *G06F 9/3832* (2013.01); *G06F 9/3838* (2013.01); *G06F 9/3842* (2013.01); *G06F 9/3848* (2013.01); *G06F 9/3806* (2013.01)

(58) Field of Classification Search
CPC .... G06F 9/3832; G06F 9/3842; G06F 9/3848; G06F 9/3806
See application file for complete search history.

(56) References Cited

U.S. PATENT DOCUMENTS

2018/0314523 A1* 11/2018 Sadasivam ............ G06F 9/3844

OTHER PUBLICATIONS

Rychlik, Bohuslav & Faistl, John & Krug, Bryon & Kurl, Albert & Sung, John & Velev, Miroslav & Shen, John. Efficient and Accurate Value Prediction Using Dynamic Classification. (Year: 2000).*
M. Bekerman et al., "Correlated load-address predictors," Proceedings of the 26th International Symposium on Computer Architecture (Cat. No. 99CB36367), Atlanta, GA, USA, 1999, pp. 54-63, (Year: 1999).*
Toshinori Sato, "A Simuluation Study of Combining Load Value and Address Predictors", International Journal of High Speed Computing, vol. 10, No. 03, pp. 301-325 (Year: 1999).*
M. Burtscherand B. G. Zorn, "Hybrid load-value predictors," in IEEE Transactions on Computers, vol. 51, No. 7, pp. 759-774, Jul. 2002, (Year: 2002).*
A. Perais and A. Seznec, "Practical data value speculation for future high-end processors," 2014 IEEE 20th International Symposium on High Performance Computer Architecture (HPCA), Orlando, FL, 2014, pp. 428-439 (Year: 2014).*

(Continued)

*Primary Examiner* — William B Partridge
*Assistant Examiner* — Kasim Alli
(74) *Attorney, Agent, or Firm* — Patterson & Sheridan, L.L.P

(57) ABSTRACT

Certain aspects of the present disclosure provide techniques for training load value predictors, comprising: determining if a prediction has been made by one or more of a plurality of load value predictors; determining a misprediction has been made by one or more load value predictors of the plurality of load value predictors; training each of the one or more load value predictors that made the misprediction; and resetting a confidence value associated with each of the one or more load value predictors that made the misprediction.

20 Claims, 7 Drawing Sheets

(56) References Cited

OTHER PUBLICATIONS

R. Sheikh, H. W. Cain and R. Damodaran, "Load Value Prediction via Path-based Address Prediction: Avoiding Mispredictions due to Conflicting Stores," 2017 50th Annual IEEE/ACM International Symposium on Microarchitecture (MICRO), Boston, MA, USA, 2017, pp. 423-435 (Year: 2017).*

Amirali Baniasadi and Andreas Moshovos. SEPAS: a highly accurate energy-efficient branch predictor. In Proceedings of the 2004 international symposium on Low power electronics and design (ISLPED '04). Association for Computing Machinery, New York, NY, USA, pp. 38-43. (Year: 2004).*

Pruett, Stephen et al. "Dynamically Sizing the TAGE Branch Predictor." (Year: 2016).*

* cited by examiner

EFFICIENT LOAD VALUE PREDICTION

INTRODUCTION

Field of the Disclosure

Aspects of the present disclosure relate to processing systems, and in particular, load value prediction within a processing system.

Description of Related Art

A processing system may face a variety of challenges in delivering increased performance. Two of the prominent challenges are the improving throughput (i.e. faster program execution) and reducing power consumption. Lower power consumption is particularly desirable for mobile devices which may depend on battery power for their operation.

A major factor in increasing throughput is load-to-use delay, i.e., load execution latency, which is the delay encountered when a load dependent instruction (or simply, a "load") fetches data from a memory hierarchy and provides it to instructions dependent on the load. A load dependent instruction is one that requires data from memory to execute. Such loads may represent 20% to 40% of the executed instructions in a computer program. Load execution latency varies depending on where the data is located in the memory hierarchy. For example if the data to be loaded is present in a cache the access may be relatively quick. If the data to be loaded is not in cache (e.g., in the case of a cache miss) load dependent instructions have to wait longer for the data and the processor's finite resources may get hung-up, resulting in lower performance and power-wasting processor stalls.

Accordingly, there is a need for loads to have quicker access to data.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

A first aspect provides a method for training load value predictors, comprising: determining if a prediction has been made by one or more of a plurality of load value predictors; determining a misprediction has been made by one or more load value predictors of the plurality of load value predictors; training each of the one or more load value predictors that made the misprediction; and resetting a confidence value associated with each of the one or more load value predictors that made the misprediction.

A second aspect provides a method of training load value predictors, comprising: for each respective epoch in a first number of epochs: tracking a number of used predictions for each load value predictor of a plurality of load value predictors during the respective epoch; comparing, at an end of the respective epoch, the number of used predictions for each load value predictor of the plurality of load value predictors to a threshold; and incrementing, at an end of the respective epoch, a usefulness counter for any load value predictor of the plurality of load value predictors exceeding the threshold; after the first number of epochs: identifying a first donor table associated with a first load value predictor of the plurality of load value predictors; and associating the first donor table with a second load value predictor of the plurality of load value predictors.

Other aspects provide processing system configured to perform the methods described above as well as those described herein, and computer-readable media comprising instructions that, when executed by a processor of a processing system, cause the processing system to perform the methods described above as well as those described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for increasing the effectiveness of load value prediction.

As microarchitectures continue to extract more instruction level parallelism from increasingly out-of-order scheduling windows, performance is increasingly limited by true data dependencies in a program. Load value prediction is a technique to break those true dependencies by allowing consumer instructions to speculatively execute ahead of their producer. In other words, load value prediction attempts to speed up the execution of load dependent instructions by predicting the value that will be produced by a particular load instruction, and allowing the dependent instructions to execute using the predicted value. The term "load instruction," as used herein refers broadly to any instruction that causes a value to be fetched from any level of memory.

Load value prediction works because instructions exhibit value locality, meaning that the same static instruction often produces a predictable value. In the case of load instructions, it is also possible to predict a load memory address, followed by a data cache access, to generate a speculative value that does not necessarily exhibit value locality. Later, when the load actually executes, it can confirm or disconfirm that prediction. If the prediction was incorrect recovery actions are performed.

Load instructions in a set of program instructions may exhibit the following properties, which can be exploited for purposes of load value prediction: loads that produce a small number of distinct values, loads that sequence through stride (constant offset) addresses, loads that encounter far less number of distinct addresses than distinct values, and loads that encounter far less number of distinct values than distinct addresses. While value predictors can generate speculative results for all instruction types, load-only predictors are most efficient with a modest hardware budget (e.g., 8 KB).

Figure 1:
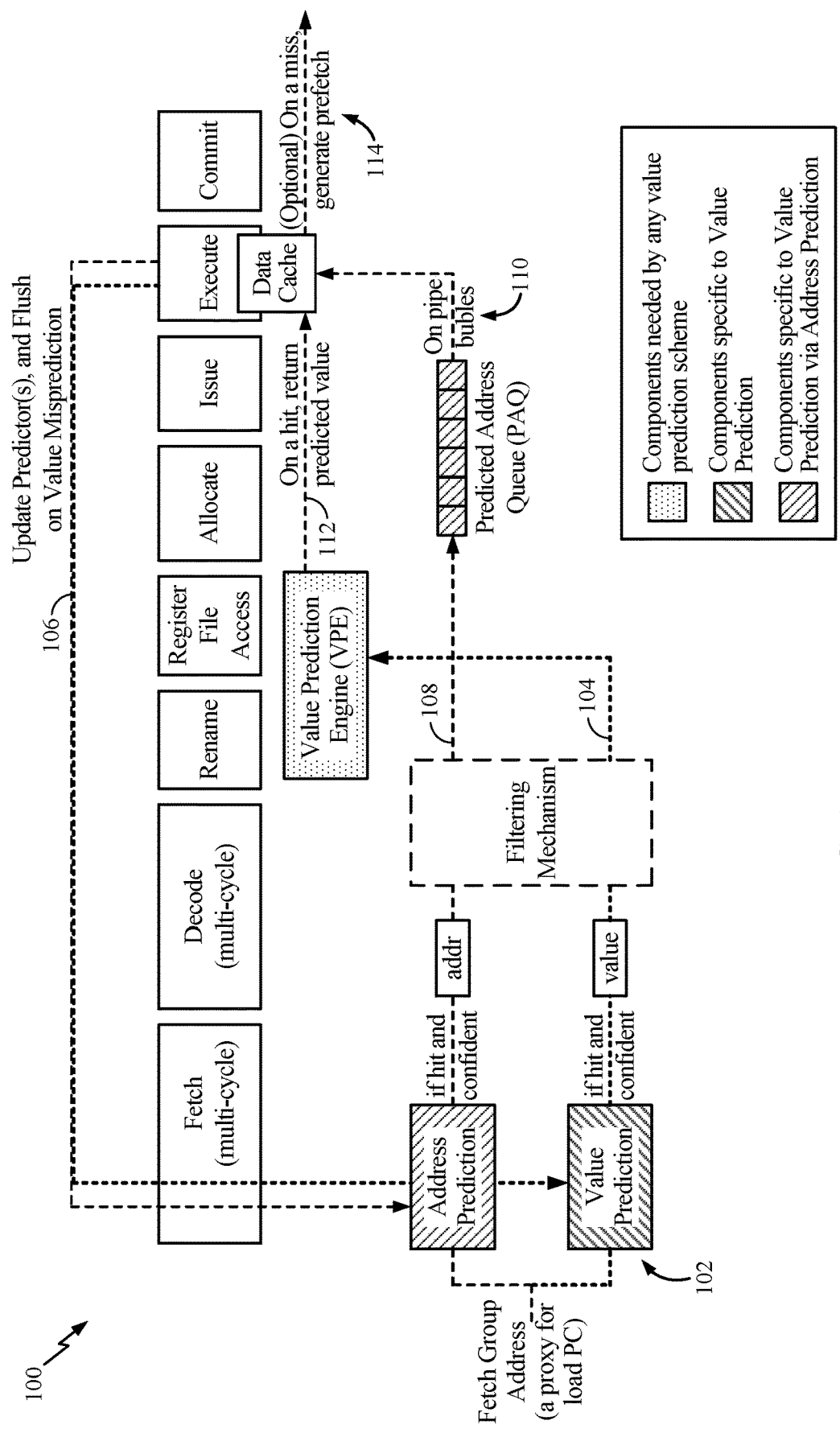
FIG. 1 depicts an example architecture to support load value prediction.

FIG. 1 depicts an example architecture 100 to support load value prediction.

There are two general approaches to load value prediction, and the goal of both is to have a predicted value ready by the time any consumer of the load enters the instruction queue (aka the scheduler). If a predictor (or predictors) can generate a correct value in time, then consumers can execute immediately, making it appear that the load has a zero-cycle load-to-use latency. Predictions are validated when the predicted load executes. If a prediction is found to be incorrect, recovery actions take place. Because the cost of a misprediction is usually high, it is important for load value predictors to deliver very high accuracy (e.g., 99% of predictions correct).

One approach to load value prediction is to directly predict the value that a static load will produce (e.g., the load at program counter (PC) X always returns zero).

In step 102, the value predictor is probed as a load is fetched, and if a high confidence prediction is found, the value is forwarded to the Value Prediction Engine (VPE) in step 104. In this implementation, the VPE provides the mechanism needed to communicate the predicted values from the value-predicted producers to their consumers. Consumers of the load can use the prediction by reading the stored value out of the VPE rather than waiting on a physical register to be ready. When the load executes, the correct value is read from the data cache and is validated against the speculative value. The predictor updates in step 106 and, if a misprediction is detected, the affected instructions are flushed and fetch is redirected to the recovery address.

Another approach to load value prediction is to use address prediction, combined with a data cache read, to generate a speculative value. Load value prediction through address prediction is similar to data prefetching except that the address is predicted when a load is fetched so that its data can be ready in the pipeline by the time any consumer of the load enters the scheduler. Address predictors are probed when a load is fetched in step 102, and if a high confidence prediction is found, the address is forwarded to the Predicted Address Queue (PAQ) in step 108. The PAQ waits for bubbles in the load pipeline, and when it finds one, probes the data cache with a predicted address in step 110. If the address hits in the data cache, then in step 112, the value is forwarded to the VPE. As long as the data returns before a consumer of the load reaches rename, the load will appear to have a zero-cycle load-to-use latency. If the predicted address misses in the data cache, then a data prefetch request may be optionally generated in step 114 to accelerate the eventual execution of the predicted load. If a predicted value is used, then the value (note, checking the address is insufficient as the value may have changed) of the load must be checked when the load executes, and if the speculative value was incorrect, a misprediction recovery is initiated in step 106.

Figure 2:
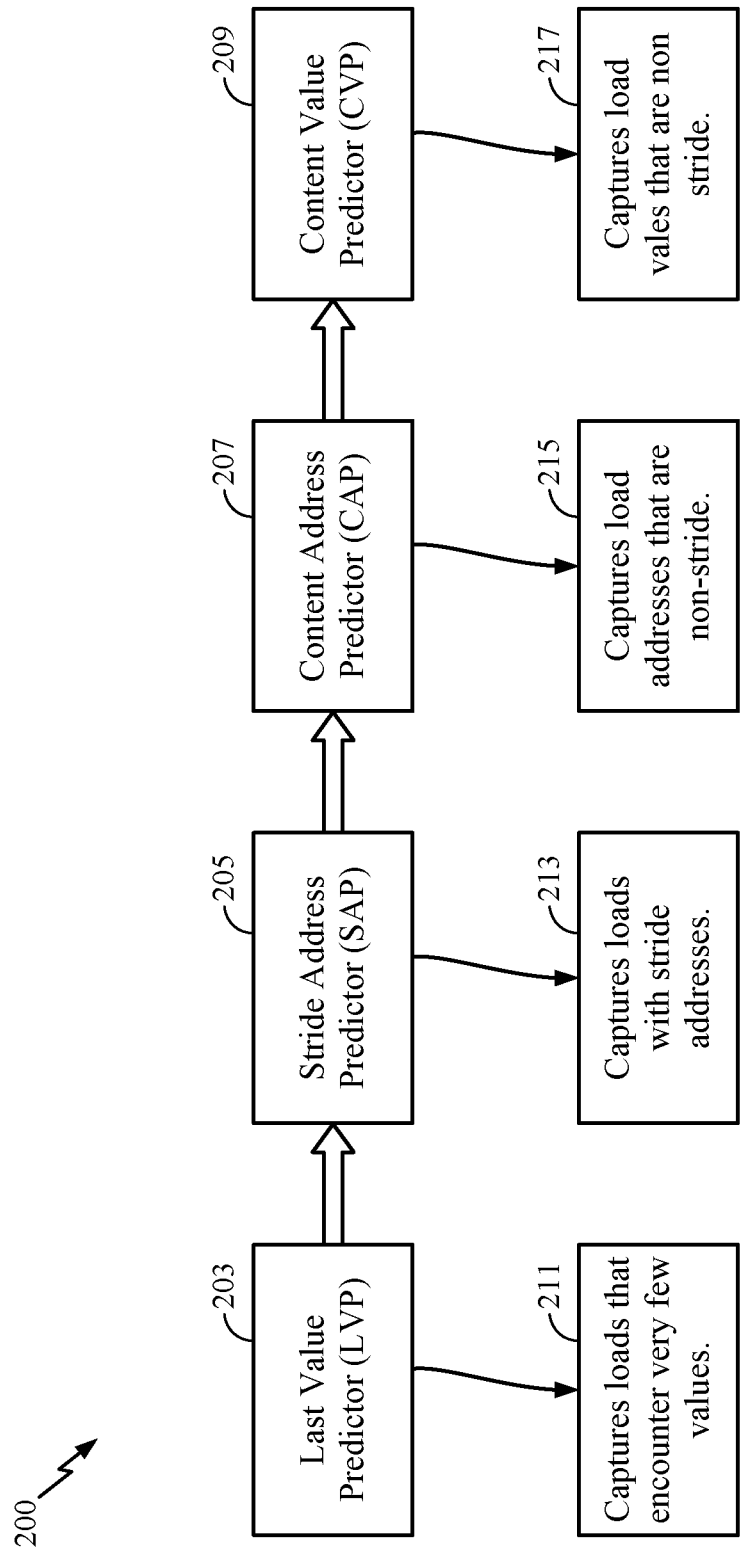
FIG. 2 is a graphical illustration of a multi-predictor design.

FIG. 2 is a graphical illustration of a multi-predictor design 200 comprising four different types of predictors.

Generally, each of the four depicted load value predictors target different load characteristics. For example, a last value predictor (LVP) 203 is targeted at static loads that produce the same value. Stride Address Predictor (SAP) 205 targets static loads that produce a predictable (strided) address. Content Address Predictor (CAP) 207 and Content Value Predictor (CVP) 209 target dynamic loads that, when taken in context, produce predictable values or addresses, respectively.

In particular, LVP 203 exploits the fact that consecutive dynamic instances of a static load will often produce the same value. This commonly occurs, for example, with PC-based loads that read large constants. The pattern can also occur when dynamic instances of a static load produce different addresses, such as when sequencing through an array just initialized with memset. Last value predictors can be viewed as members of the stride value predictors family, where the stride is zero.

In this example, LVP 203 may be configured to capture loads that encounter very few values 211 and provide the value 211 as a predicted value for a load instruction. LVP 203 may record, as the value 211, a value that was accessed by an instruction at a particular program counter location.

However, various implementations are possible for LVP 203. For example, LVP 203 may: record any number of values and then find the most repeated value; eliminate recorded values that appear only sporadically; or only save the last load value and use that the last load value as the value 211, to note a few examples. In some implementations, a program may be executed to record a history of values that were fetched by an instruction at a particular program counter location in order to train the predictor. The process of recording a history of values, which may be address and/or data values, to make a prediction is referred to as training the predictor.

In some implementations, LVP 203 may be trained when a load executes by hashing the PC bits of a load to access an entry and then updating the entry's tag and value. If the new tag/value match the existing tag/value, then the confidence may be increased (e.g., probabilistically); otherwise, the confidence may be reset to zero.

To establish the efficacy of a predictor, such as LVP 203, training may include a tally of predictor accuracy. In one aspect the predictor accuracy may use a MPKI (Missed Predictions per thousand (Kilo) Instructions) metric. A predictor may be trained as the program is executing, or the training may have occurred from previous executions of the program or both.

To make a prediction, the PC of a newly fetched load is hashed to access an entry, and if the tag matches and the confidence is above the threshold, then the stored value will be used as a prediction.

It may be preferable that LVP 203 has high confidence to avoid reducing performance through mispredictions. In some implementations, a confidence threshold corresponding to 64 consecutive observations of a value may be used.

In some implementations, LVP 203 uses a PC-indexed, tagged prediction table in which each entry contains a 14-bit tag, 64-bit value, and a 3-bit saturating confidence counter, for a total of 81 bits per entry.

As above, SAP 205 identifies static loads that produce strided addresses (possibly with stride=0), and then probes the data cache to retrieve a predicted value. That is, SAP 205 does not predict load values directly, but instead provides a predicted memory address by adding the stride (offset) to a previous address 213. The stride may be determined during a training process, though a predetermined stride may also be used. The value at the address plus the offset may then be fetched and used, or placed in a cache for quick access. The stride detection logic is similar to the logic in a stride-based data prefetcher.

To train SAP 205, when a load executes, it hashes the PC to identify a predictor table entry, writes the delta between the load address and the last known load address into the stride field, and updates the size field to the log base two of the load width. If the tag entry matches and the calculated stride equals the stored stride, then the confidence counter is incremented; otherwise, the confidence counter is reset to zero. Because short-lived strides cause many mispredictions, a confidence of 9 consecutive observations may be used in order to achieve 99% accuracy in some implementations.

After confidence is high, stride address prediction produces a predicted address by adding the last known load address to the stride and sends the address to the PAQ (in FIG. 1) where it will wait for a pipeline bubble and probe the data cache. The returned value is used to speculate while the predicted value is verified. Stride address prediction takes into account the number of inflight occurrences of the load instruction, when making a prediction.

In some implementations of SAP 205, a PC-indexed, tagged prediction table may be maintained wherein each entry contains a 14-bit tag, a 49-bit virtual address representing the last known load address for the PC, a 2-bit saturating confidence counter, a 10-bit stride, and a 2-bit load size indicator, for a total of 77 bits per entry.

CAP 207 predicts a non-stride load address 215. To predict the memory address the CAP may use the program counter (PC) of a load instruction and other information (e.g., global branch history, branch path history, load path history . . . etc.), to predict the memory address of the load. The load path history may be the program counters history of previous load instructions. The predicted memory address can be used to probe the data cache early for quick access later.

CAP 207 may be configured to use program history along with load PC to generate more accurate predictions, but in such configurations, CAP 207 uses the data cache as a value store rather than directly generating values from the predictor. It has been shown that load addresses correlate more closely to global load path history (prior N load PCs) rather than branch path history.

In one implementation, a CAP 207 consists of one tagged table indexed by a hash of PC and load path history. An entry contains a 14-bit tag, a 49-bit virtual address, a 2-bit confidence, and a 2-bit load size, for a total of 67 bits. When a load completes, it updates the table by setting the tag, value, and size. If the new tag, value, and size match the existing entry, the confidence is incremented; otherwise, the confidence is reset to zero. A prediction is made when a fetched load has a tag match and confidence is high. CAP has the lowest confidence threshold of all predictors, corresponding to four consecutive observations of a give path/load PC.

Finally, CVP 209 uses program history along with load PC to generate more accurate predictions. So, for example, CVP 209 learns the load value that follows a particular context and then predicts a value when that reoccurs in that particular context. CVP 209 thus captures load values that are non-strided 217. CVP is inspired by branch prediction, which has observed that branch behavior is correlated with the path history leading to the branch. It has been shown that for CVP the same holds true for all instruction values and for load instructions in particular.

To illustrate one example, CVP 209 may capture the branch history preceding the load instruction of interest and correlate it with a value obtained when the load instruction of interest is executed. The context may contain data points such as subroutine depth, processor flags, etc. Then, CVP 209 may use the address predicted by CAP 207 to predict load data value.

In some implementations, CVP 209 may comprise three tables, all of which are indexed using a hash of the PC and a geometric sample of the branch path history. In some implementations, each table entry stores a 14-bit tag, a 64-bit value, and 3-bit saturating confidence counter, for a total of 81 bits (same of LVP). When a load executes, all three tables may be updated in a similar manner as last value prediction to train the predictor. When predicting a value, context aware value prediction uses a value from the table with the longest history whose entry has high confidence. Like last value prediction, context aware value prediction requires high confidence to build high accuracy, so forward probabilistic counters may be used with a confidence threshold corresponding to 16 consecutive observations.

Accordingly, value predictors LVP 203 and CVP 205 predict load values directly, while address predictors CAP 207 and SAP 209 predict load values indirectly by attempting to predict the location of the load value, then using the predicted location to predict or fetch the value at that location. Some efficiency could be achieved by storing the address predicted by CAP 207 and SAP 209 in the same memory location and some efficiency could be achieved by storing the predicted load value of all the predictors in a single memory location. However this efficiency may not be available during the training process, unless the predictors are trained serially, i.e. one at a time.

In some aspects, all predictors (e.g., 203, 205, 207, and 209) may be continually trained and run (i.e. making predictions) while the program is executing. While this method may be effective, it is not without costs. For example, training all predictors continuously would continually require power and memory for all of the predictors. This can be a waste of processor resources, particularly if one or more of the predictors is continually trained and not actually used for prediction, in which case the memory used to continually train the predictor would be of no use, and consume power and generate heat.

Additionally the predictor accuracy from a previous program execution may be used. However this method also has drawbacks. For example, the current execution of the program may be very different than a previous execution of the same program so that the accuracy of each predictor may be different than a previous execution of the program. Additionally, a nonvolatile method of recording the load instruction and associated predictor may be required to remember which predictors were used in the previous program execution. Accordingly, an improved training scheme may be used in some implementations, as described below.

Efficient Load Value Prediction

When considering the aforementioned predictors described with respect to FIG. 2, load value predictors may be generally preferable because they do not require a data cache access, and are not susceptible to cache misses, cache bandwidth constraints, and the increased power of a cache access. Further, context unaware predictors may be preferable because they are more storage-efficient. For example, a single entry in a context-unaware predictor can cover more dynamic loads than a single entry in a context-aware predictor.

Further, even though all four predictors use different strategies to predict load values, there will be overlap in the predictions they provide. For example, testing has shown as many as 66% of loads are predicted by more than one predictor. In some cases, address predictors (SAP and CAP) pick up most of the loads that can only be predicted by one predictor type, indicating that many more loads have predictable address patterns than predictable value patterns. Thus, all four of the aforementioned predictors (e.g., LVP 203, SAP 205, CAP 207, and CVP 209 in FIG. 2) may be combined to create a composite predictor. In such a configuration, all four components may train in parallel, and a prediction from any predictor that is highly confident may be used.

Because in some implementations all predictors are tuned for very high accuracy (e.g., 99%), highly confident predictors rarely disagree. For example, test results have shown that highly-confident predictors disagree less than 0.03% of the time in some cases. Therefore, choosing among highly-confident predictors has little impact on performance. However, there is a power implication because when multiple predictors are confident, a value predictor is preferable since it is most power efficient (e.g., there is no need to speculatively access the data cache), and then chose context-aware over context-agnostic (for accuracy reasons).

To mitigate the overlap in the predictions provided by each component in the composite predictor, a training policy may be used that steers loads to a subset, rather than all, of predictors at training time. This may improve performance by avoiding redundancy in the component predictor state.

Smart Training of Predictors

In one implementation, a smart predictor training algorithm works as follows. If no prediction was made, all predictors are trained to minimize the amount of time to get a confident prediction. However, if one or more predictions are made, only the predictors that (a) mispredicted, or (b) have the lowest cost are trained. By always training a component that produced an incorrect prediction, a quick eviction of the associated entry (a trained misprediction resets confidence) in encouraged.

Predictors that produce a correct prediction may be trained in the following order that prefers value over address and context-agnostic over context-aware: LVP, CVP, SAP, and CAP. Thus, the range of "cost" for predictors from lowest to highest is in the same order.

Additionally, whenever SAP produced a correct prediction, but was not chosen for training, the SAP entry may be invalidated. By skipping training, the SAP stride will be broken, effectively rendering the entry useless anyway. For example, if all four predictors produced correct predictions, the LVP entry may be trained and the SAP entry invalidated, meanwhile, CVP and CAP are not trained.

Figure 3:
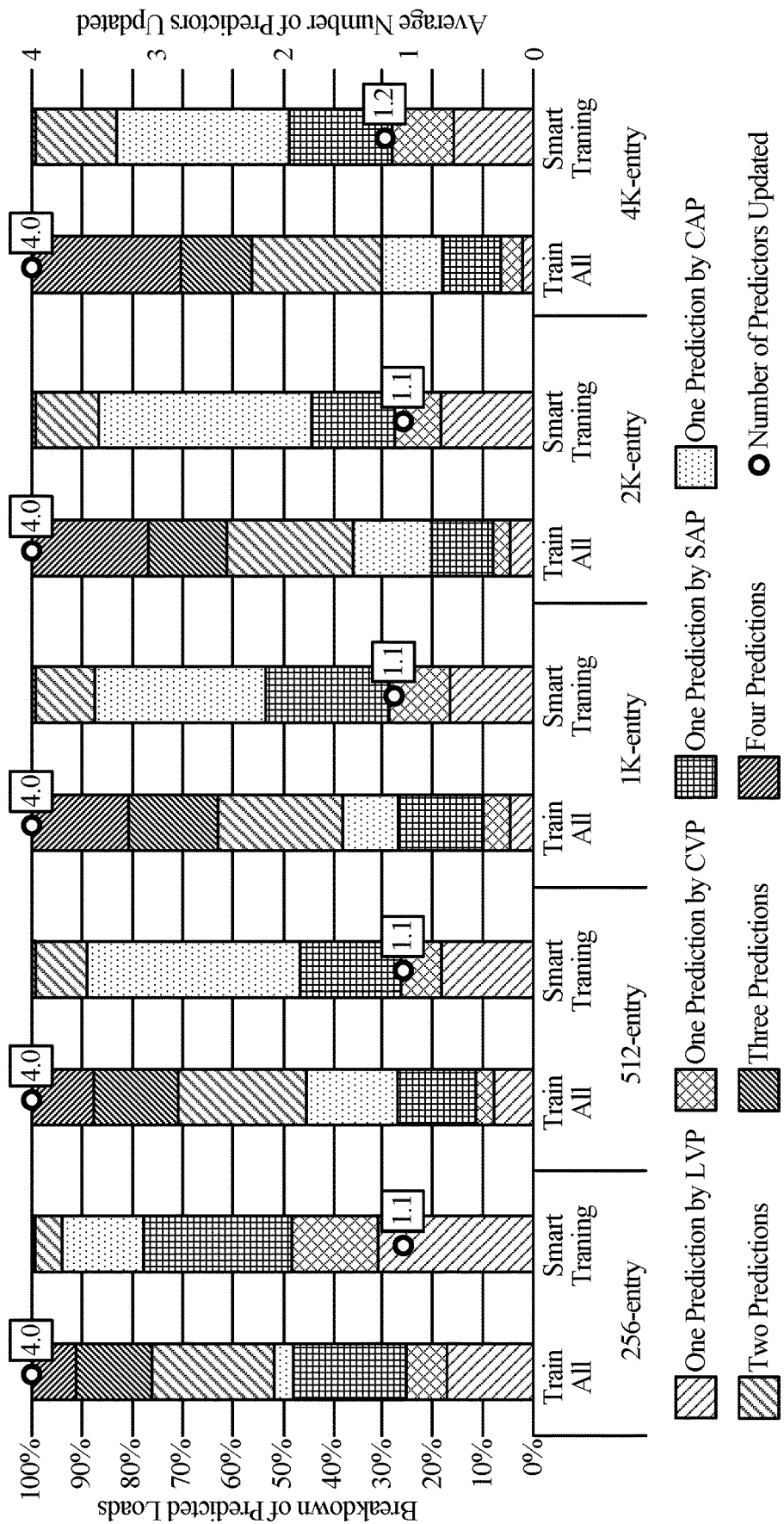
FIG. 3 depicts an example of the number of predictions with and without smart training of predictors.

FIG. 3 depicts an example breakdown of the number of predictions with and without smart training as described above. In particular, FIG. 3 shows a significant reduction in the number of times multiple predictions are made. For example, for a 1K-entry composite predictor, the percentage of time multiple predictions are made reduces from 62% to 12%. FIG. 3 also shows the average number of predictors updated at training time, and, notably, smart training results in updating close to one predictor on average.

Figure 4A:
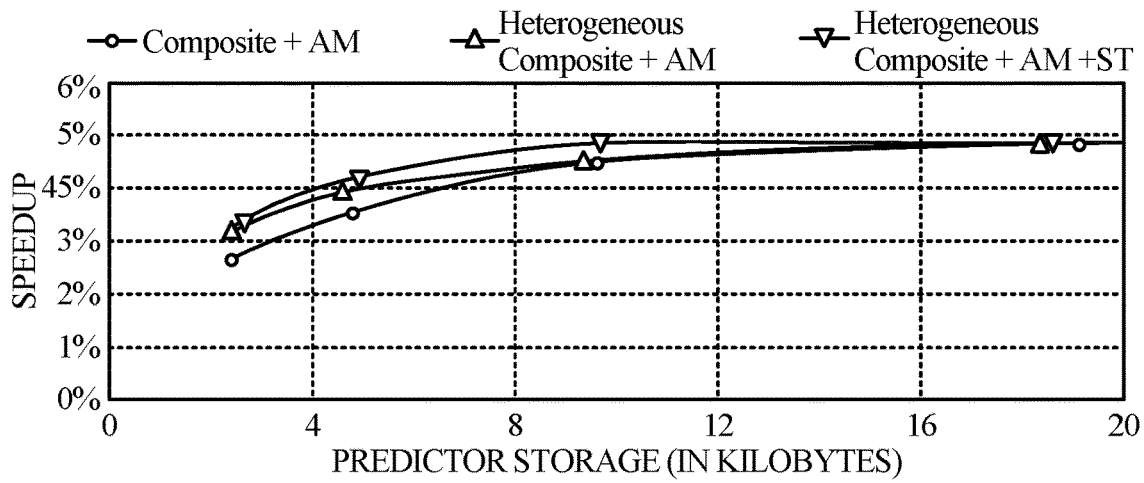
FIG. 4A shows an example of the performance gains from smart training.

FIG. 4A shows an example of the performance gains achieved from smart training. Further, FIG. 4A demonstrates that smart training is most effective for small and moderate size predictors, which makes sense because larger predictors are less sensitive to small changes in effective table size.

Table Fusion

The component predictors described above with respect to FIG. 2 may have similar storage requirements. To exploit situations in which the component predictors do have similar storage requirements, a table fusion mechanism may be employed that dynamically reallocates tables entries from predictors with low accuracy to predictors with higher accuracy. For example, in one implementation, all component predictors use the same table width of 81 bits and the same number of entries (no heterogeneous allocation).

The table fusion process separates component predictors into two groups: donors and receivers. "Donors" are predictors that, over the recent past, have not been very productive (e.g., have a low number of used prediction). Conversely, "receivers" are predictors that have been useful in the recent past (e.g., have a high number of used prediction). After classifying the predictors, the fusion mechanism repurposes donor tables as extra storage for receiver predictors. Notably, while it is possible to donate partial tables, a preferred implementation may include donating entire predictor tables for best performance.

The table fusion process is epoch based; for example, it may be reset every one million instructions in one implementation. During the execution of an epoch, the number of used predictions is tracked for each component predictor. At the end of an epoch, the number of used predictions is compared to a threshold (e.g., corresponding to 20 predictions per thousand instructions in one implementations), and a usefulness counter is incremented for any predictor exceeding the threshold. After N epochs (e.g., N=5 in one implementation), donor tables are identified (e.g., those with predictions used lower than threshold in at least one epoch) and receiver tables are identified (e.g., corresponding to all other predictors). After M epochs (M>>N,M=25), the fusion is reverted and the process is repeated.

If there is at least one donor table after M epochs, fusion occurs. For example, when there is one donor (and three receivers), the receiver with the highest number of used predictions gets the donor table. When there are two donors and two receivers, each receiver fuses with one of the donors. When there are three donors and one receiver, the receiver fuses with all three donors. Donors are flushed at fusion time, because they hold invalid information.

When fusion occurs, the donor tables are added as if they were additional cache ways of the now set-associative receiver table. This approach greatly simplifies indexing and data management, though it is possible to maintain a direct-mapped structure to further power use.

When tables are unfused, the donor tables are flushed (again) while the receiver tables are maintained since they still contain valid data.

Figure 4B:
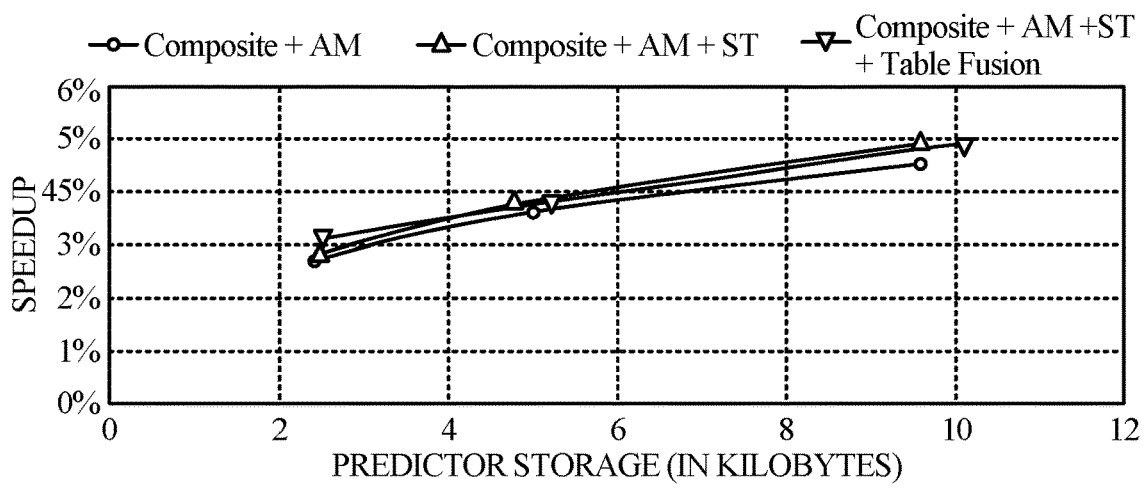
FIG. 4B shows an example of the performance gains from table fusion.

FIG. 4B shows an example of the performance gains from table fusion. Like the smart training optimization discussed above, table fusion is most helpful on small predictors.

Figure 4C:
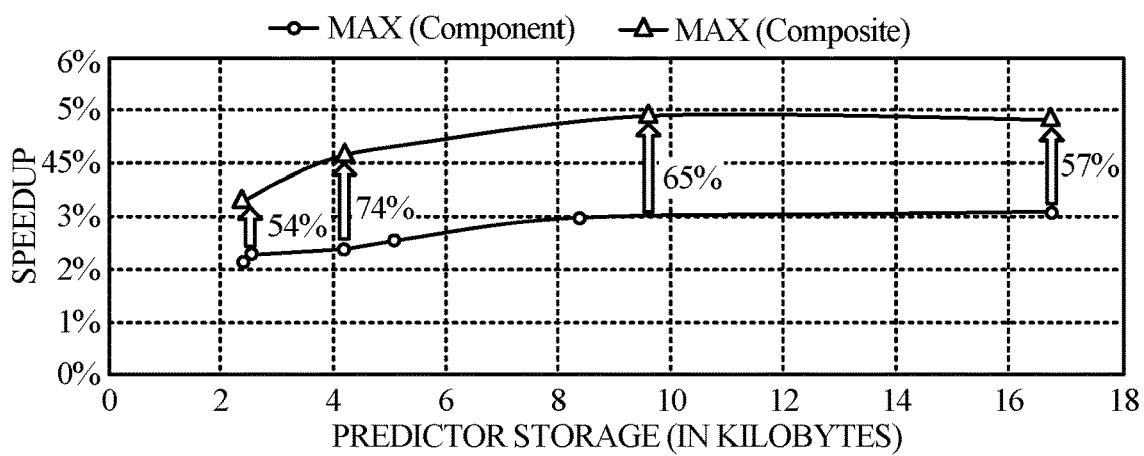
FIG. 4C shows an example of the performance gains when combining with a composite predictor and utilizing the smart training and table fusion optimizations.

FIG. 4C shows an example of the performance gains when combining the previously discussed component predictors to make a composite predictor and utilizing the smart training and table fusion optimizations. At all sizes, the composite predictor provides a >50% performance boost over a single component predictor. Even though not shown, under comparable budgets, the composite predictor significantly outperforms any of the component predictors, in terms of speedup and coverage, on every individual workload.

Figure 5:
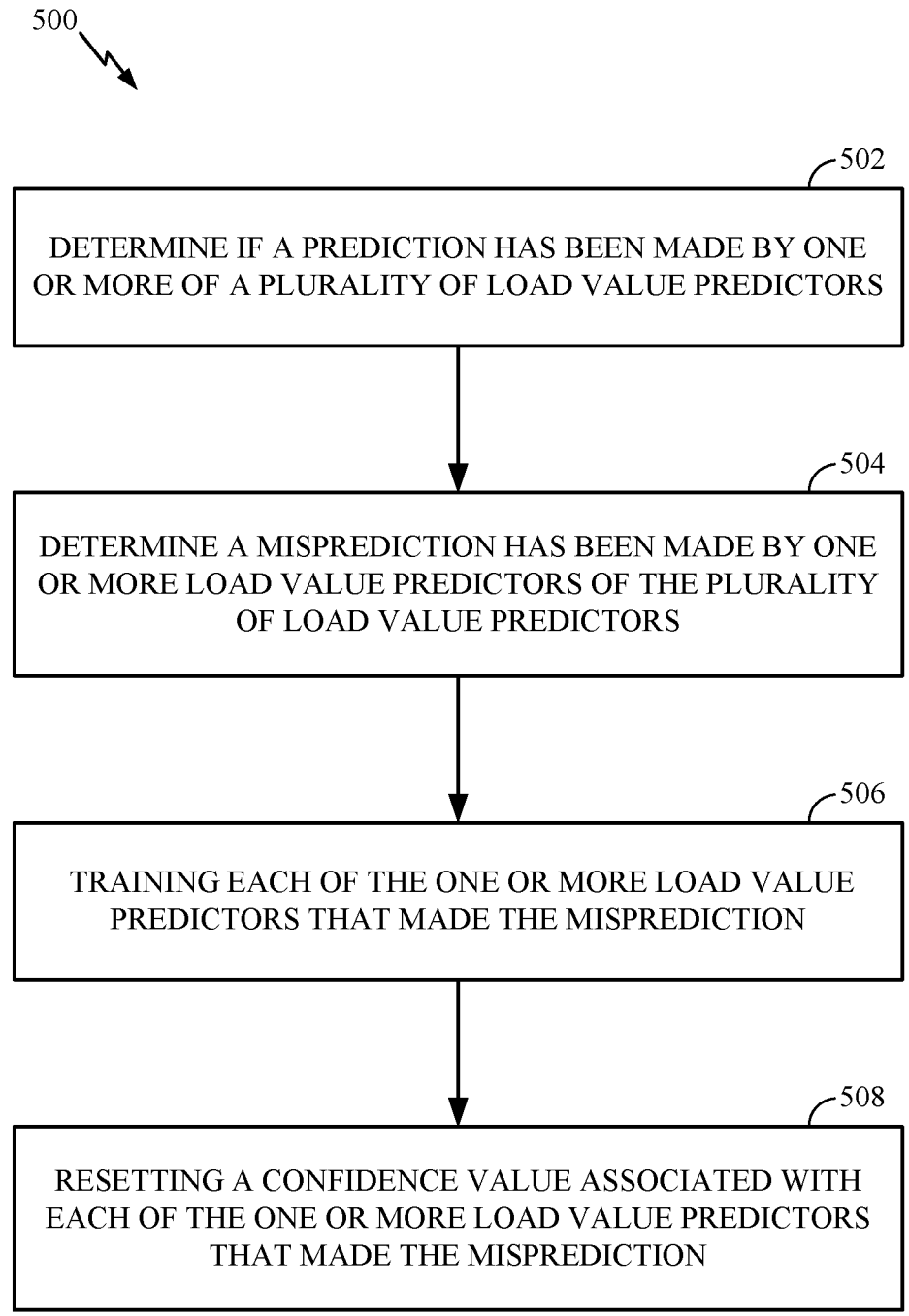
FIG. 5 depicts an exemplary method of training a plurality of component predictors.

FIG. 5 depicts an exemplary method 500 of training a plurality of component load value predictors.

Method 500 begins at step 502 with determining if a prediction has been made by one or more of a plurality of load value predictors.

In some implementations, the plurality of load value predictors comprises: a last value predictor (LVP); a context value predictor (CVP); a stride address predictor (SAP); and a context address predictor (CAP), as described above with respect to FIG. 2.

Method 500 then proceeds to step 504 with determining a misprediction has been made by one or more load value predictors of the plurality of load value predictors:

Method 500 then proceeds to step 506 with training each of the one or more load value predictors that made the misprediction.

Method 500 then proceeds to step 508 with resetting a confidence value associated with each of the one or more load value predictors that made the misprediction.

Though not depicted in FIG. 5, in implementations, method 500 further includes determining that two or more load value predictors of the plurality of load value predictors made a correct prediction and based on this determination, training the load value predictor of the two or more load value predictors that has a lowest cost value.

In some implementations, the LVP has a first cost value $C_{LVP}$, the CVP has a second cost value $C_{CVP}$, the SAP has a third cost value $C_{SAP}$, the CAP has a fourth cost value $C_{CAP}$, and $C_{LVP} < C_{CVP} < C_{SAP} < C_{CAP}$.

In some implementations, method 500 further includes determining that the SAP is one of two or more load value predictors that made the correct prediction and, based on that determination, determining not to train the SAP and invalidating the SAP.

In some implementations, method 500 further includes determining that no prediction has been made by any of the plurality of load value predictors and, based on that determination, training the plurality of load value predictors.

Figure 6:
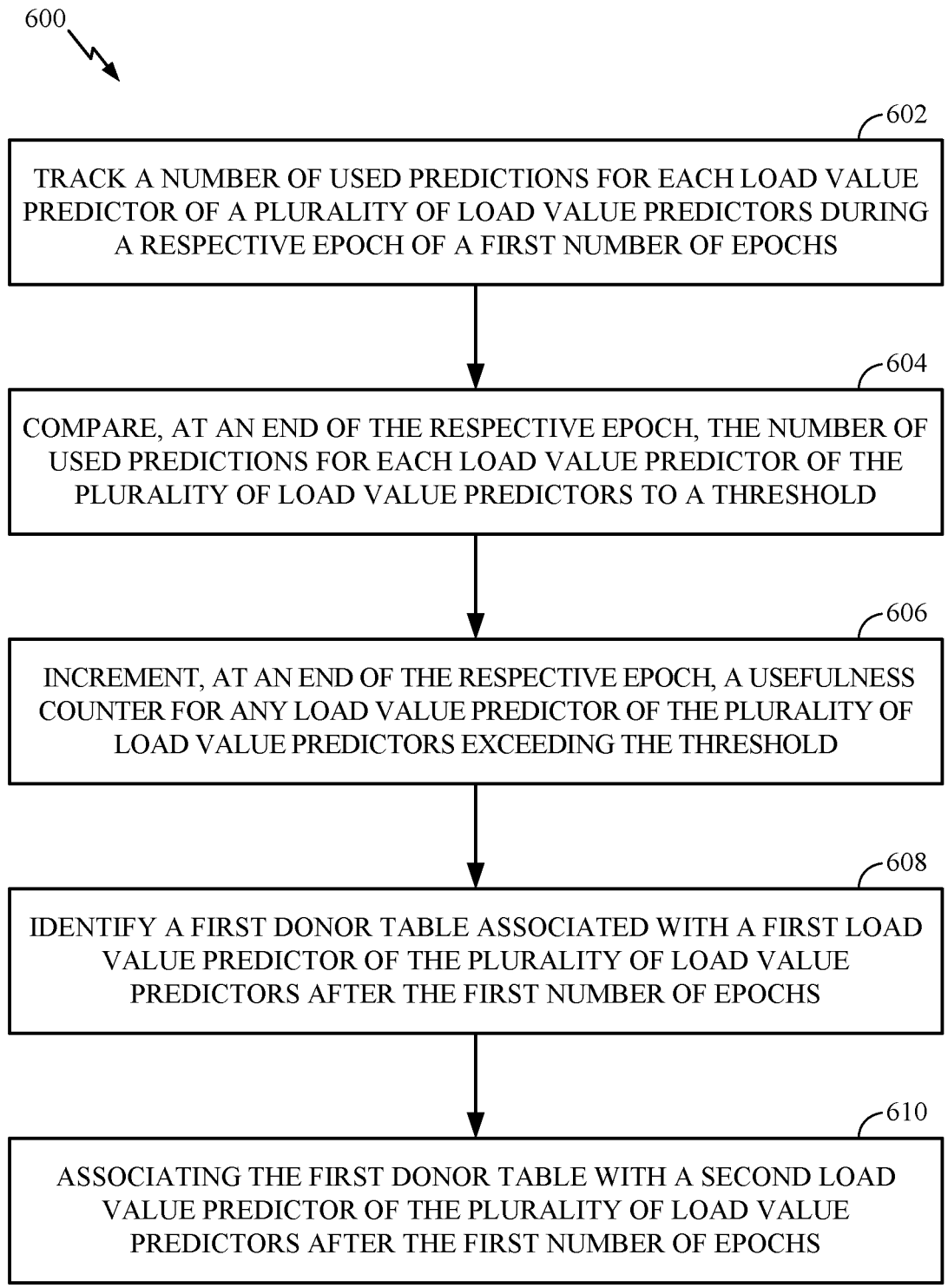
FIG. 6 depicts an exemplary method of table fusion using a plurality of component predictors.

FIG. 6 depicts an exemplary method of table fusion using a plurality of component predictors.

Method 600 begins at step 602 with tracking a number of used predictions for each load value predictor of a plurality of load value predictors during a respective epoch of a first number of epochs.

Method 600 then proceeds to step 604 with comparing, at an end of the respective epoch, the number of used predictions for each load value predictor of the plurality of load value predictors to a threshold.

Method 600 then proceeds to step 606 with incrementing, at an end of the respective epoch, a usefulness counter for any load value predictor of the plurality of load value predictors exceeding the threshold.

Method 600 then proceeds to step 608 with identifying a first donor table associated with a first load value predictor of the plurality of load value predictors after the first number of epochs.

Method 600 then proceeds to step 610 with associating the first donor table with a second load value predictor of the plurality of load value predictors after the first number of epochs.

In some implementations of method 600, associating the first donor table with the second load value predictor of the plurality of load value predictors further comprises: determining that the second load value predictor has a highest usefulness counter value of a plurality of usefulness counter values associated with the plurality of load value predictors.

Though not depicted in FIG. 6, in some implementations, method 600 further includes identifying a second donor table associated with a third load value predictor of the plurality of load value predictors; and associating the second donor table with a fourth load value predictor of the plurality of load value predictors.

In some implementations, method 600 further includes identifying a second donor table associated with a third load value predictor of the plurality of load value predictors; identifying a third donor table associated with a fourth load value predictor of the plurality of load value predictors; and associating the second donor table and the third donor table with the first load value predictor of the plurality of load value predictors.

In some implementations, a value of a usefulness counter associated with the first load value predictor is less than the threshold after at least one epoch of the first number of epochs.

In some implementations, the first number of epochs is five epochs.

In some implementations, method 600 further includes after a second number of epochs, re-associating any first donor table with the first load value predictor; and flushing any data in the first donor table.

In some implementations, the second number of epochs is 25 epochs.

In some implementations, the threshold is 20 predictions per thousand instructions.

Figure 7:
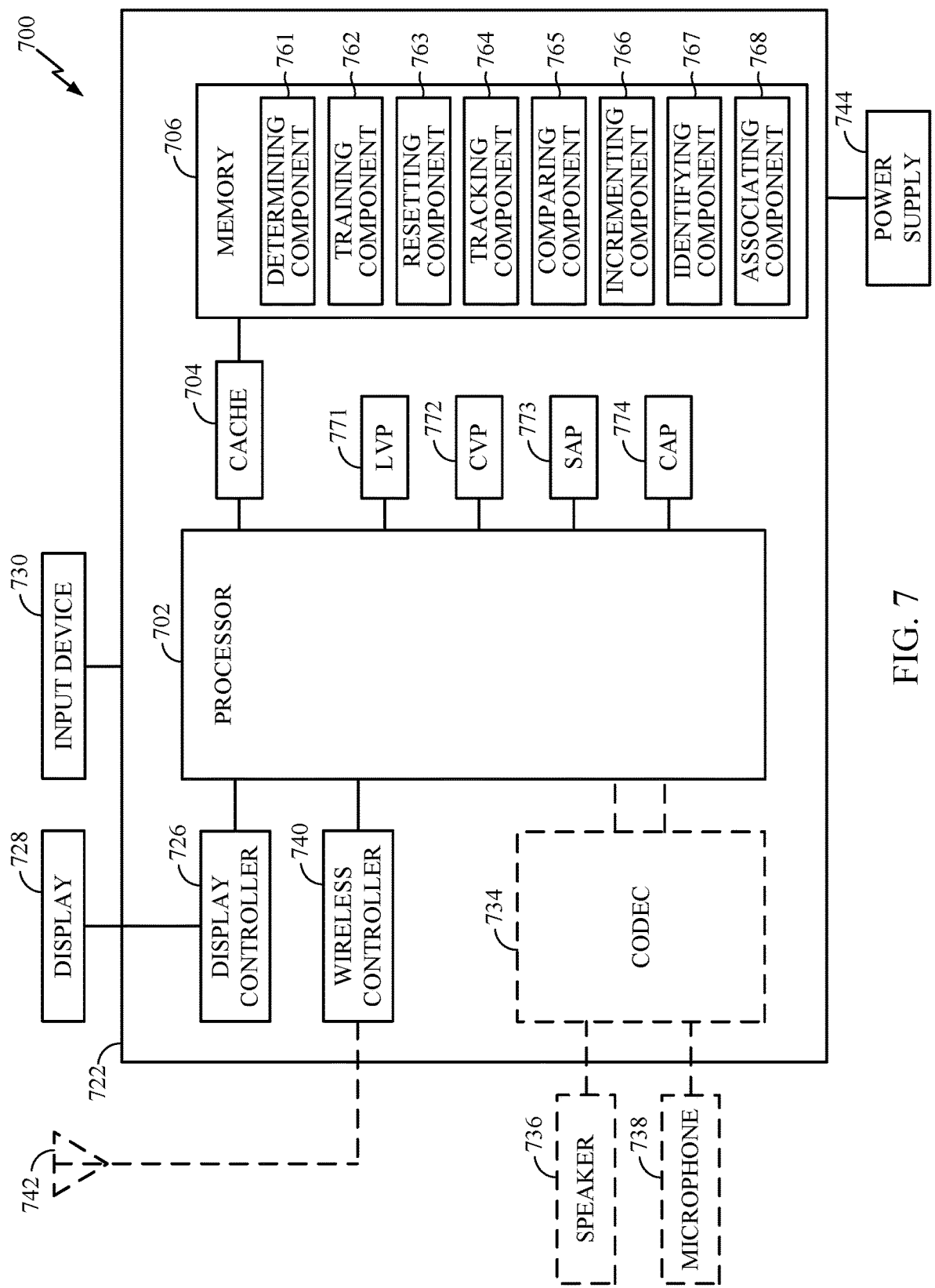
FIG. 7 depicts an exemplary computing device in which an aspect of the disclosure may be advantageously employed.

FIG. 7 depicts an exemplary computing device in which an aspect of the disclosure may be advantageously employed.

Processor 702 is exemplarily shown to be coupled to memory 706 with cache 704 disposed between processor 702 and memory 706, but it will be understood that other configurations known in the art may also be supported by computing device 700.

Memory 706 includes various example components that may be configured to perform the functions described herein. For example, memory 706 includes determining component 761, training component 762, and resetting component 763, which may be configured to perform the functions described above with respect to method 500 in FIG. 5. Further, memory 706 includes tracking component 764, comparing component 765, incrementing component 766, identifying component 767, and associating component 768, which may be configured to perform the functions described above with respect to FIG. 6. Other components are possible, and these are merely some examples.

Device 700 also includes a plurality of predictors, including a last value predictor (LVP) 771, a context value predictor (CVP) 772, a stride address predictor (SAP) 773, and a context address predictor (CAP) 774, such as described above with respect to FIG. 2.

Display controller 726 that is coupled to processor 702 and to display 728. In some cases, computing device 700 may be used for wireless communication and FIG. 7 also shows optional blocks in dashed lines, such as coder/decoder (CODEC) 734 (e.g., an audio and/or voice CODEC) coupled to processor 702 and speaker 736 and microphone 738 can be coupled to CODEC 734; and wireless antenna 742 coupled to wireless controller 740 which is coupled to processor 702. Where one or more of these optional blocks are present, in a particular aspect, processor 702, display controller 726, memory 710, and wireless controller 740 are included in a system-in-package or system-on-chip device 722.

Accordingly, a particular aspect, input device 730 and power supply 744 are coupled to computing device 700, Moreover, in a particular aspect, as illustrated in FIG. 7, where one or more optional blocks are present, display 728, input device 730, speaker 736, microphone 738, wireless antenna 742, and power supply 744 may be external to computing device 700. Additionally, each of display 728, input device 730, speaker 736, microphone 738, wireless antenna 742, and power supply 744 can be coupled to a computing device 700 through an interface or a controller.

It should be noted that although FIG. 7 generally depicts a computing device, processor 702, cache 704 and memory 706, may also be integrated into a set top box, a server, a music player, a video player, an entertainment unit, a navigation device, a personal digital assistant (PDA), a fixed location data unit, a computer, a laptop, a tablet, a communications device, a mobile phone, or other similar devices.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for training load value predictors, comprising:
   determining that a plurality of load value predictors have made a plurality of respective predictions that predict a value of respective load instructions;
   determining that the plurality of respective predictions comprises:
     one or more incorrect predictions; and
     one or more correct predictions;
   training each load value predictor associated with the one or more incorrect predictions;
   resetting a confidence value associated with each load value predictor associated with the one or more incorrect predictions;
   classifying a first load value predictor of the plurality of load value predictors as a donor based on determining a first amount of used predictions for the first load value predictor not meeting a threshold;
   classifying a second load value predictor of the plurality of load value predictors as a receiver based on determining a second amount of used predictions for the second load value predictor meeting the threshold;
   converting a storage table of the first load value predictor to a storage table of the second load value predictor based on classifying the first load value predictor as the donor and classifying the second load value predictor as the receiver; and
   not training at least one load value predictor associated with the one or more correct predictions.

2. The method of claim 1, wherein the plurality of load value predictors comprise:
   a last value predictor (LVP);
   a context value predictor (CVP);
   a stride address predictor (SAP); and
   a context address predictor (CAP).

3. The method of claim 2, further comprising:
   determining that two or more load value predictors of the plurality of load value predictors made the one or more correct predictions; and
   training only one load value predictor of the two or more load value predictors that has a lowest cost value.

4. The method of claim 3, wherein:
   the LVP has a first cost value $C_{LVP}$,
   the CVP has a second cost value $C_{CVP}$,
   the SAP has a third cost value $C_{SAP}$,
   the CAP has a fourth cost value $C_{CAP}$, and
   $C_{LVP} < C_{CVP} < C_{SAP} < C_{CAP}$.

5. The method of claim 4, further comprising:
   determining that the SAP is one of the two or more load value predictors that made the one or more correct predictions;
   determining not to train the SAP; and
   invalidating the SAP.

6. The method of claim 2, further comprising:
   determining that one or more load value predictors of the plurality of load value predictors has made no prediction; and training the one or more load value predictors of the plurality of load value predictors that has made no prediction.

7. The method of claim 1, wherein training each load value predictor associated with the one or more incorrect predictions comprises training only one load value predictor associated with the one or more incorrect predictions at a time.

8. A processing system for training load value predictors, comprising:
a memory comprising computer-executable instructions;
a processor configured to execute the computer-executable instructions and cause the processing system to:
determine that a plurality of load value predictors have made a plurality of respective predictions that predict a value of respective load instructions;
determine that the plurality of respective predictions comprises:
one or more incorrect predictions; and
one or more correct predictions;
train each load value predictor associated with the one or more incorrect predictions;
reset a confidence value associated with each load value predictor associated with the one or more incorrect predictions;
classify a first load value predictor of the plurality of load value predictors as a donor based on determining a first amount of used predictions for the first load value predictor not meeting a threshold;
classify a second load value predictor of the plurality of load value predictors as a receiver based on determining a second amount of used predictions for the second load value predictor meeting the threshold;
convert a storage table of the first load value predictor to a storage table of the second load value predictor based on classifying the first load value predictor as the donor and classifying the second load value predictor as the receiver; and
not train at least one load value predictor associated with the one or more correct predictions.

9. The processing system of claim 8, wherein the plurality of load value predictors comprise:
a last value predictor (LVP);
a context value predictor (CVP);
a stride address predictor (SAP); and
a context address predictor (CAP), and
wherein:
the LVP has a first cost value $C_{LVP}$,
the CVP has a second cost value $C_{CVP}$,
the SAP has a third cost value $C_{SAP}$,
the CAP has a fourth cost value $C_{CAP}$, and
$C_{LVP} < C_{CVP} < C_{SAP} < C_{CAP}$.

10. The processing system of claim 9, wherein the processor is further configured to cause the processing system to:
determine that two or more load value predictors of the plurality of load value predictors made the one or more correct predictions:
train only one load value predictor of the two or more load value predictors that has a lowest cost value.

11. The processing system of claim 10, wherein the processor is further configured to cause the processing system to:
determine that the SAP is one of the two or more load value predictors that made the one or more correct predictions;
determine not to train the SAP; and
invalidate the SAP.

12. The processing system of claim 8, wherein the processor is further configured to cause the processing system to:
determine that one or more load value predictors of the plurality of load value predictors has made no prediction; and
train the one or more load value predictors of the plurality of load value predictors that has made no prediction.

13. The processing system of claim 8, wherein the processor is further configured to cause the processing system to train only one load value predictor associated with the one or more incorrect predictions at a time.

14. A non-transitory computer-readable medium comprising instructions that, when executed by a processor of a processing system, cause the processing system to perform a method for training a plurality of load value predictors, the method comprising:
determining that the plurality of load value predictors have made a plurality of respective predictions that predict a value of respective load instruction;
determining that the plurality of respective predictions comprises:
one or more incorrect predictions, and
one or more correct predictions;
training each load value predictor associated with one of the one or more incorrect predictions;
resetting a confidence value associated with each load value predictor associated with the one or more incorrect predictions;
classifying a first load value predictor of the plurality of load value predictors as a donor based on determining a first amount of used predictions for the first load value predictor not meeting a threshold;
classifying a second load value predictor of the plurality of load value predictors as a receiver based on determining a second amount of used predictions for the second load value predictor meeting the threshold;
converting a storage table of the first load value predictor to a storage table of the second load value predictor based on classifying the first load value predictor as the donor and classifying the second load value predictor as the receiver; and
not training at least one load value predictor associated with one of the one or more correct predictions.

15. The non-transitory computer-readable medium of claim 14, wherein the plurality of load value predictors comprise:
a last value predictor (LVP);
a context value predictor (CVP);
a stride address predictor (SAP); and
a context address predictor (CAP).

16. The non-transitory computer-readable medium of claim 15, wherein the method further comprises:
determining that two or more load value predictors of the plurality of load value predictors made the one or more correct predictions; and
training only the load value predictor of the two or more load value predictors that has a lowest cost value.

17. The non-transitory computer-readable medium of Claim 16, wherein:
the LVP has a first cost value $C_{LVP}$,
the CVP has a second cost value $C_{CVP}$,
the SAP has a third cost value $C_{SAP}$,
the CAP has a fourth cost value $C_{CAP}$, and
$C_{LVP} < C_{CVP} < C_{SAP} < C_{CAP}$.

18. The non-transitory computer-readable medium of claim 17, wherein the method further comprises:
- determining that the SAP is one of the two or more load value predictors that made the one or more correct predictions;
- determining not to train the SAP; and
- invalidating the SAP.

19. The non-transitory computer-readable medium of claim 15, wherein the method further comprises:
- determining that one or more load value predictors of the plurality of load value predictors has made no prediction; and
- training the one or more load value predictors of the plurality of load value predictors that has made no prediction.

20. The non-transitory computer-readable medium of claim 14, wherein training each load value predictor associated with the one or more incorrect predictions comprises training only one load value predictor associated with the one or more incorrect predictions at a time.

* * * * *